(12) United States Patent
Biermann et al.

(10) Patent No.: US 9,068,639 B2
(45) Date of Patent: Jun. 30, 2015

(54) ARRANGEMENT FOR SUPPORTING AN INPUT GEAR OF TRANSMISSION

(75) Inventors: Thorsten Biermann, Wachenroth (DE); Fritz Wiesinger, Heilsbronn (DE); Markus Klinger, Weissenburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/994,887

(22) PCT Filed: Oct. 24, 2011

(86) PCT No.: PCT/EP2011/068550
§ 371 (c)(1),
(2), (4) Date: Jun. 17, 2013

(87) PCT Pub. No.: WO2012/084302
PCT Pub. Date: Jun. 28, 2012

(65) Prior Publication Data
US 2013/0276566 A1    Oct. 24, 2013

(30) Foreign Application Priority Data

Dec. 21, 2010    (DE) .................... 10 2010 055 411

(51) Int. Cl.
  F16H 57/08   (2006.01)
  F16H 57/00   (2012.01)
  F16H 57/021  (2012.01)
  F16H 57/02   (2012.01)

(52) U.S. Cl.
  CPC ....... *F16H 57/0031* (2013.01); Y10T 74/19647 (2015.01); F16H 57/08 (2013.01); *F16H 57/021* (2013.01); F16H 2057/02043 (2013.01)

(58) Field of Classification Search
  None
  See application file for complete search history.

(56) References Cited

U.S. PATENT DOCUMENTS

| 3,929,036 | A | * | 12/1975 | Shealy ........................ 475/235 |
| 4,914,800 | A |   | 4/1990  | Cook |
| 6,045,479 | A | * | 4/2000  | Victoria et al. ............... 475/230 |
| 7,651,276 | B2 |  | 1/2010  | Nied et al. |
| 2003/0236147 | A1 | | 12/2003 | Fett |
| 2007/0099747 | A1 | * | 5/2007 | Ando et al. ................... 475/331 |
| 2010/0304914 | A1 | * | 12/2010 | Barrett et al. ................. 475/160 |

FOREIGN PATENT DOCUMENTS

| DE | 19546330 C1 | 3/1997 |
| DE | 10331348 A1 | 5/2004 |
| EP | 1900565 A2  | 3/2008 |

* cited by examiner

*Primary Examiner* — Ramya Burgess
*Assistant Examiner* — Timothy Hannon
(74) *Attorney, Agent, or Firm* — Davidson, Davidson & Kappel, LLC

(57) ABSTRACT

An arrangement for supporting an input gear of a transmission in a motor vehicle, in particular a ring gear, characterized in that a pot-shaped support element (1) is provided, whereby a drive gear to drive the input gear engages into a recess (2) of the support element (1), and, for purposes of bearing the input gear, the support element (1) extends at least partially underneath the input gear radially on the inside.

15 Claims, 5 Drawing Sheets

ARRANGEMENT FOR SUPPORTING AN INPUT GEAR OF TRANSMISSION

The present invention relates to an arrangement for supporting an input gear of a transmission in a motor vehicle, in particular a ring gear.

BACKGROUND

Such an arrangement is disclosed in German patent specification DE 195 46 330 C1. This document describes a differential gear with differential bevel gears for driving the axle shafts of a motor vehicle, whereby the ring gear is supported on the differential cage or differential housing in order to drive the differential gear. In this configuration, the ring gear has to have a diameter that corresponds to that of the differential housing. This has the drawback that the ring gear entails a costly configuration with gear teeth whose size matches this large diameter, and the ring gear also has to be designed so that it can withstand the high loads that are encountered. Moreover, such a support is not possible with a planetary gear element since in this case, a differential cage as such is not present.

SUMMARY OF THE INVENTION

It is an object of the present invention to simplify the structure of an arrangement of the above-mentioned type and to configure it so that it can be flexibly adapted to the design of the transmission and so as to be inexpensive.

The present invention provides a pot-shaped support element is proposed that has a recess into which the drive gear can engage in order to drive the input gear. At the same time, a support of the input gear is easily achieved in that, for purposes of bearing the input gear, the support element extends at least partially underneath the input gear radially on the inside. Owing to the arrangement according to the invention, the drive of the transmission can be moved radially closer to the main transmission axle, thereby minimizing the diameter of the gearwheel and the loads on the input gear as well as the manufacturing costs. Moreover, it is thus possible to flexibly adapt the drive gear and the input gear to the installation situation in the transmission, especially on one side of the transmission, or else to arrange them between two gear elements. According to the invention, the support element can preferably be configured as a single part, which simplifies the structure and reduces the manufacturing and installation costs in comparison to a support configured with several parts. Furthermore, in order to engage with the drive gear, the input gear can be arranged so that it projects at least partially into the support element, thus saving installation space.

In order to support a ring gear that is used to drive a planetary gear, the support element is preferably arranged coaxially to the ring gear. In this context, it is advantageous if a drive pinion for driving the ring gear engages radially into the recess of the support element, so that the drive of the planetary gear can be moved closer to the main transmission axle. As a result, the diameter of the ring gear can be substantially reduced. For purposes of holding the bearing of the ring gear, the support element preferably has a protruding ring collar on its side facing the ring gear. Owing to its diameter that is smaller than that of the ring gear, this ring collar extends so as to overlap at least partially with the inner circumference of the ring gear. In a simple manner, on its inner circumference, the support element can hold a bearing to support the ring gear on the ring collar. Thus, the ring collar can especially extend underneath the teeth of the ring gear, thereby supporting the ring gear on its teeth radially on the inside.

In the overlapping area, the bearing of the ring gear is preferably supported, on the one hand, on the inner circumference of the ring gear and, on the other hand, on the ring collar.

The bearing of the ring gear can be arranged so as to essentially be radially flush with the teeth of the ring gear, thus saving installation space.

In order to ensure an unimpeded compensation of lubricant or motor oil in the transmission between the two axial sides of the support element, preferably at least one axial through-opening is provided on the radially outer edge area of the support element.

Preferably, the support element is made of sheet metal and can be very easily produced by means of sheet-metal working processes, especially deep-drawing.

It is advantageous for certain sections of the support element to have a slightly curved shape that matches the contour of the ring gear in the area of the protruding teeth of said ring gear. As a result, the teeth of the ring gear can extend into the support element at a distance separated by an air gap, so that it is made possible for the ring gear to engage with the angular gear, especially at a pinion head, inside the support element, thus further reducing the installation space needed.

In the area of the curved ring section, the support element—at its side facing away from the ring gear—can simultaneously form a ring-shaped bearing surface for an axial bearing.

The support element can be easily and non-rotatably joined to a stationary part, especially a gear housing, by means of an outer ring collar that projects radially on the outside, and at this ring collar, the support element can be inserted into the gear housing, for instance, at a spline, or else by means of an interference fit. In order for the angular gear to engage into the support element, the ring collar is interrupted, at least in parts, at the recess provided on the support element for this purpose.

In one variant of the invention, the support element is configured as a sintered part.

In this context, the support element can be configured radially on the inside with a ring support that projects in the form of a collar facing away from the ring gear and that forms a ring-shaped axial bearing surface on the end face.

The ring support can be reinforced by means of a ribbed structure that is distributed along its circumference and that runs radially outwards from the circumference with a diminishing height.

In order to hold the drive shaft of the drive gear, especially the pinion shaft of the drive pinion of the angular gear, it is possible to provide a bearing receptacle for a so-called pilot bearing on the support element in the area of the recess. For example, a cylindrical depression that is flush with the drive shaft or pinion shaft can be provided for this purpose in the area of the recess.

BRIEF DESCRIPTION OF THE DRAWINGS

Additional features of the invention ensue from the description below and from the drawings in which several embodiments of the invention are depicted in simplified form. The following is shown.

DETAILED DESCRIPTION OF THE DRAWINGS

Figure 1:
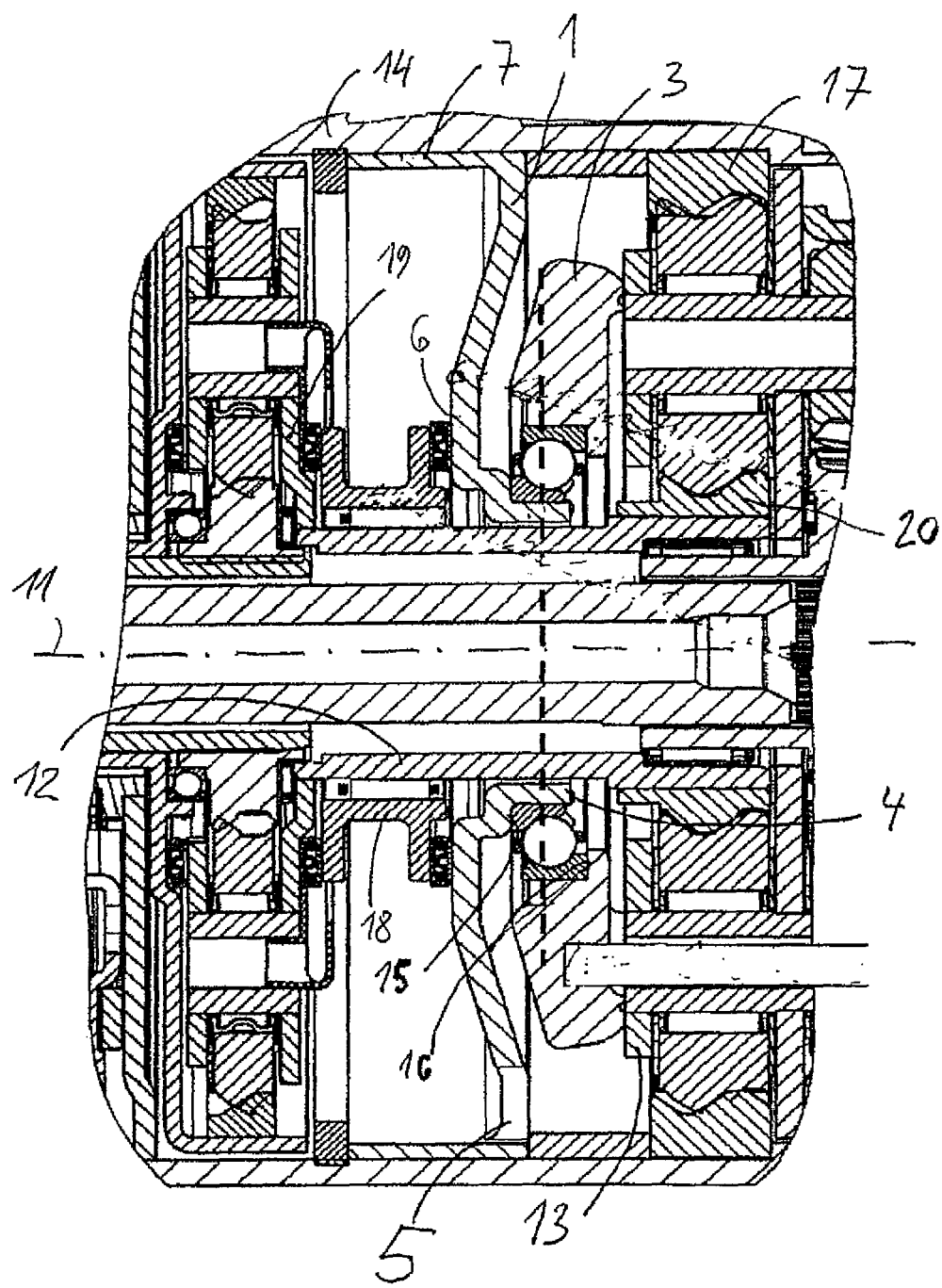
FIG. 1 a sectional view of an arrangement according to the invention, in a first embodiment.

FIG. 1 shows an arrangement according to the invention for supporting a drive gear of a transmission, in a first embodiment. Two planetary gear elements of an axle drive for a hybrid vehicle are arranged coaxially at a distance from each other along the drive axle 11, which at the same time, forms the main transmission axle, and they are drive-connected by means of an intermediate shaft 12 configured as a hollow shaft. The planetary gear elements are arranged axially at a distance from each other in such a way that a drive gear, here an angular gear, can engage into an axial gap formed between said planetary gear elements in order to drive a planetary gear element. The angular gear consists of a drive pinion (not shown here) that projects perpendicular to the drive axle 11 into said gap and that engages with the teeth 3 of a ring gear. The ring gear is arranged coaxially to the drive axle 11 on the side of the planetary gear element that faces the gap and that is to be driven, and its teeth 3 project into the gap. On its axial rear side facing away from the gap, the ring gear is firmly connected to the planet carrier 13 of the planetary gear element.

For purposes of supporting the ring gear, a pot-shaped support element 1 is provided which is arranged coaxially in the gap between the planetary gear elements. The radially outer edge area of the support element has a recess 2 (FIG. 2) into which the pinion head of the angular gear projects radially and engages with the ring gear. Here, certain sections of the support element are configured in the area of the teeth 3 of the ring gear with a slightly axially curved shape that matches the contour of said ring gear. As a result, the teeth 3 extend partially axially into the support element, so that, at the recess 2, the bevel pinion can engage into the teeth 3 of the ring gear inside the support element 1.

The ring gear is rotatably supported on the support element 1 by means of a bearing. Here, the support element 1 is arranged in the flux of force between a stationary gear housing 14 and the bearing of the ring gear. For the bearing of the ring gear, the support element 1 is configured with an axially protruding inner ring collar 4 radially on the inside at a central shaft passage through which one of the axle shafts passes, and it is configured with the gear housing 14 radially on the outside on an axially protruding outer ring collar 7. The inner ring collar 4 faces the ring gear and it has a smaller diameter than that of the ring gear. The inner ring collar 4 engages at a distance in the radial inner direction underneath the teeth 3 of the ring gear and in this process overlaps with the radial inside of the ring gear side.

For the bearing of the ring gear, an angular ball bearing is provided that, with its outer bearing ring, is supported directly on the radial inside of the teeth 3 of the ring gear, and with its inner bearing ring, is supported directly on the inner ring collar 4 of the support element. For this purpose, a complementary ring shoulder is formed on the radial inside of the teeth 3 as well as on the radial outside of the inner ring collar 4, said ring shoulder then holding the outer ring and the inner ring of the angular ball bearing, respectively. In this context, the ring shoulders form contact surfaces 15, 16 that are oriented axially opposite from each other and that are provided for the bearing rings. In this manner, the angular ball bearing is axially secured on both sides. The positioning of the bearing of the ring gear, essentially flush with the teeth 3 of the ring gear, as indicated by the broken line, translates into a space-saving arrangement.

On the radially outer ring collar 7, the support element 1 can be inserted positively or non-positively, for instance, by means of an interference fit or on a spline on the inside of the stationary gear housing 14. The support element on the outer ring collar 7 is axially secured on both sides on the gear housing 14 by means of a spacer ring at a distance from the internal gearwheel 17 of the planetary gear element on the one hand, and by means of a housing nut on the other hand.

The support element, at its curved radial ring section that matches the contour of the teeth 3 of the ring gear, forms a ring-shaped axial bearing surface 6 on the end face, at the side facing away from the ring gear. The support element 1 rests axially on this bearing surface 6 by means of a differential ring 18 on the planet carrier 19 of the planetary gear element located opposite from the ring gear. The differential ring 18 has a U-shaped cross sectional profile on whose two U sides the differential ring 18 is supported on the planet carrier 19 by means of an axial needle bearing on the one hand, and on the ring-shaped bearing surface 6 on the other hand. At the same time, the intermediate shaft 12 is supported on the closed U side of the cross sectional profile of the differential ring 18 by a needle roller bearing. Manufacturing tolerances in the transmission can be compensated for via the axial height of the U sides of the differential ring 18. The intermediate shaft 12 and the firmly connected sunwheel 20 of the planetary gear element on the ring gear side are supported on the opposite planetary gear element by means of an axial bearing.

The support element has an axial through-opening 5 on the radially outer edge area. This through-opening serves to compensate for the amount of motor oil present between the two axial sides of the support element. The support element 1 is preferably made of sheet metal and can be easily manufactured by deep-drawing.

Figure 2:
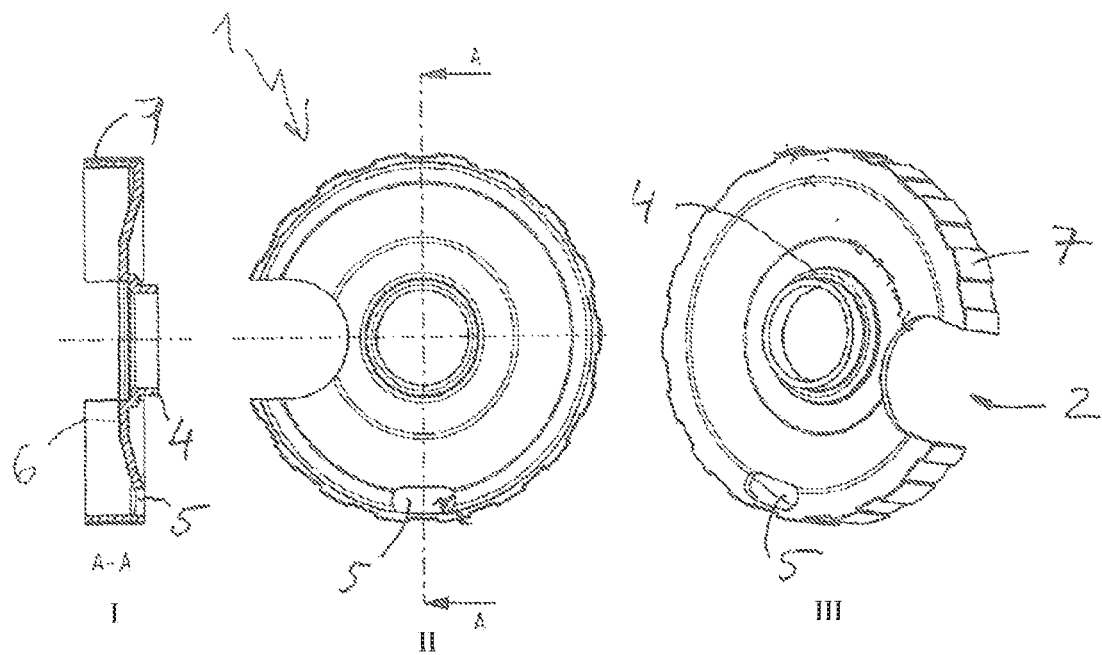
FIG. 2 a compilation of several individual views of an inventive support element of the arrangement of the first embodiment.

FIG. 2 shows the support element 1 in a compilation of three individual views, namely, a sectional view along the line A-A, a side view facing away from the ring gear and a side view facing the ring gear. The pot-shaped cross sectional profile is interrupted radially on the outside by the outer ring collar 7 that serves for fastening purposes and by the recess 2 on the outer edge area in order to hold the drive pinion of the angular gear, and it is formed radially on the inside by the inner ring collar 4 together with the ring shoulder for purposes of holding the bearing of the ring gear. The outer ring collar 7 and the inner ring collar 4 are joined together by the ring section that extends radially and that, in this process, forms the bottom of the pot-shaped cross-sectional profile and that is slightly curved in the axial direction radially inwards in the area of the shaft passage. The recess 2 and the through-opening 5 that extends like a slot in the circumferential direction on the outer edge area are arranged so as to be offset relative to each other by 90°. Starting at the outer edge, the recess 2 extends radially inwards to approximately half of the radius. For fastening purposes, a spline is provided on the outer circumference of the outer ring collar 7. On its side facing away from the ring gear, the curved ring section forms the ring-shaped axial bearing surface 6 in the area of the shaft passage.

Figure 3:
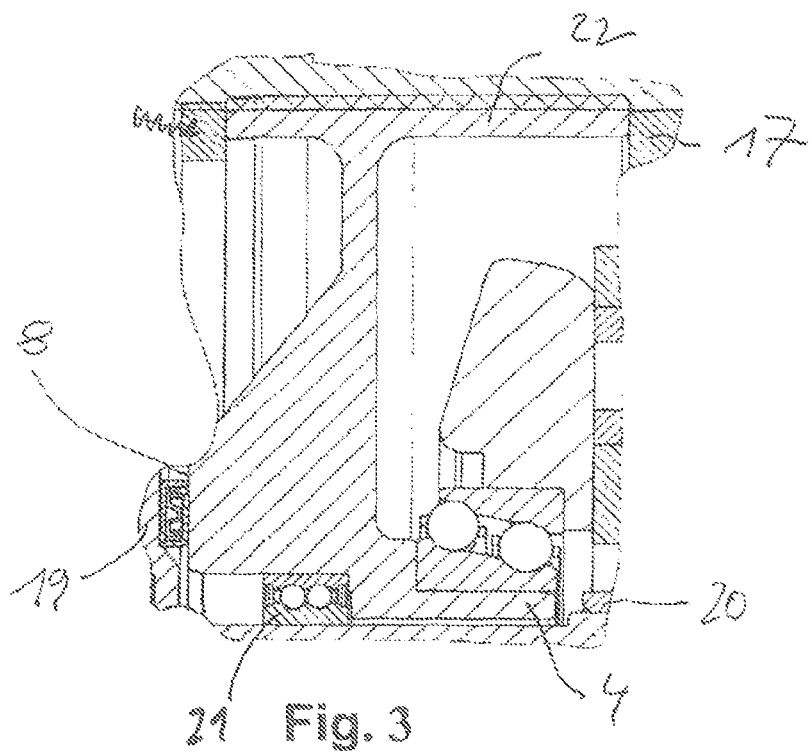
FIG. 3 a partial sectional view of an arrangement according to the invention, in a second embodiment.

FIG. 3 shows a second embodiment in which the support element 1 is preferably configured as a sintered part. In this embodiment, a collar-shaped, axially protruding ring support that faces away from the ring gear is provided as a single piece on the support element 1 in the area of the central shaft passage. The end face of the ring support is shaped in such a manner that it extends all the way to the planet carrier 19 of the planetary gear element that is opposite from the ring gear, where it forms a ring-shaped axial bearing surface 8 that serves to support the planet carrier 19, whereby the support element 1 rests on this bearing surface 8 by means of an axial needle bearing. This embodiment dispenses with the need for an additional differential ring 18 of the type required in the embodiment according to FIG. 1 since its function is already integrated into the support element 1 by the ring support. A ring shoulder that holds a fixed bearing 21 which supports the intermediate shaft 12 and which is configured as a twin-row deep-groove ball bearing is formed on the radial inside of the ring support in the area of the shaft passage. The fixed bearing 21 serves to axially secure the intermediate shaft 12 and, at the same time, also the sunwheel 20 of the planetary gear element on the ring gear side that is firmly joined to said intermediate shaft 21. The ring gear is supported on the inner ring collar 4 of the support element by means of a tandem angular ball bearing.

Radially on the outside and starting at its radial ring section, the support element 1 forms a double outer ring collar 22 which extends in both axial directions, and onto which the support element with the gear housing is connected non-rotatably by means of a spline. In this context, the axial attachment in the direction of the planetary gear element on the ring gear side is effectuated by an outer ring collar 22 that rests on the internal gearwheel 17, thus dispensing with the need for the spacer ring that was required in the embodiment according to FIG. 1.

Figure 4:
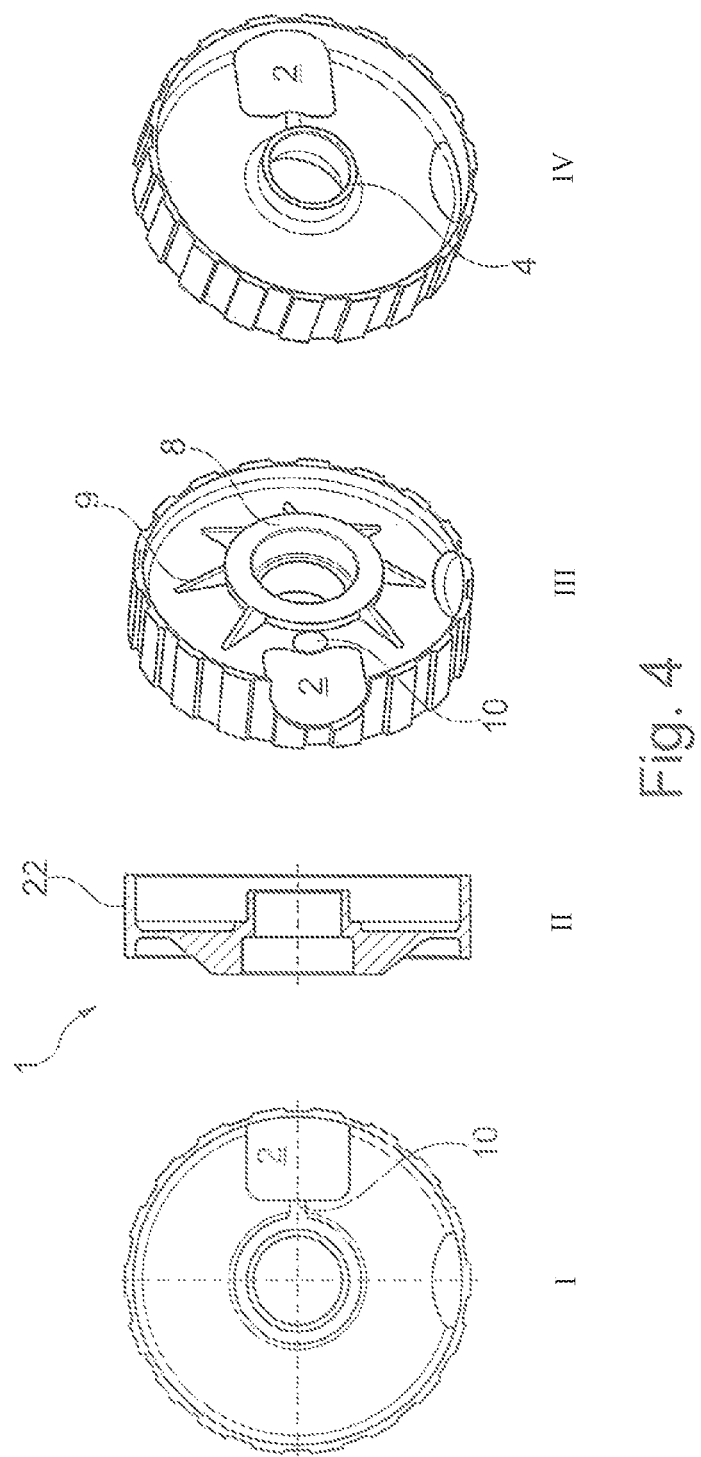
FIG. 4 a compilation of several individual views of an inventive support element of the arrangement in the second embodiment.
Figure 5:
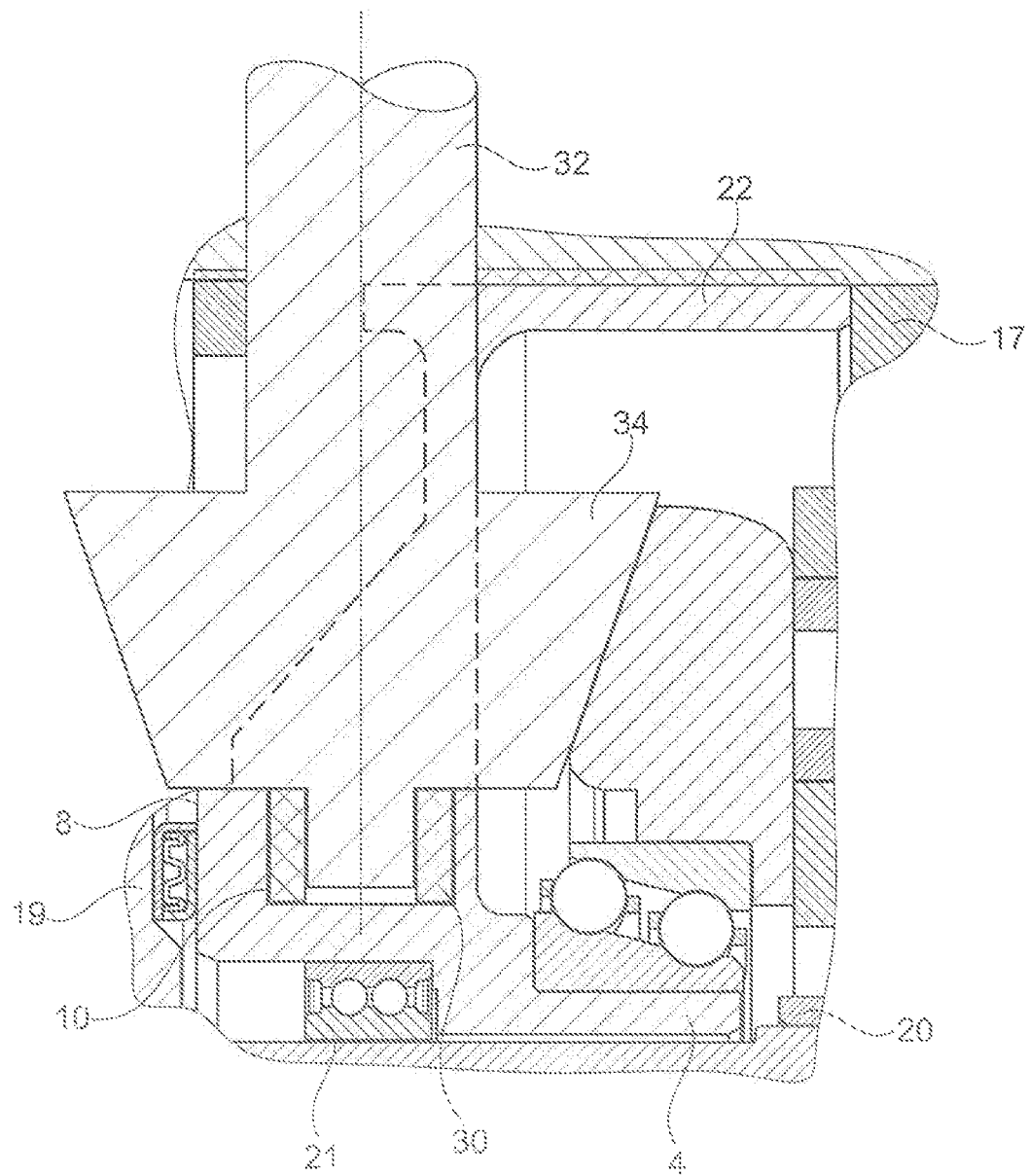
FIG. 5 a partial sectional view of the arrangement of the second embodiment at a recess in a radially outer area of a support element.
Figure 6:
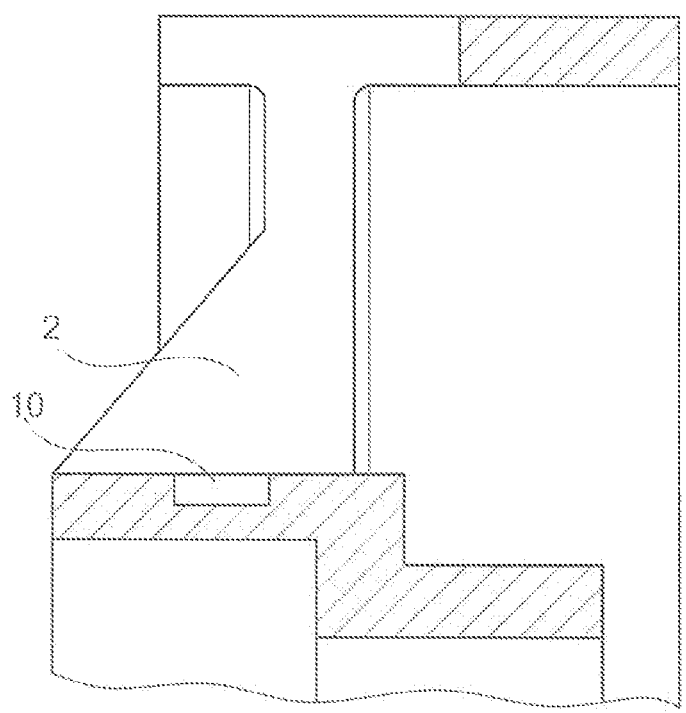
FIG. 6 a partial sectional view of a radially oriented cylindrical depression holding a so-called pilot bearing of a drive shaft of a drive gear.

FIG. 4 shows a compilation of several individual depictions of the support element 1, namely, a view on the ring gear side and a sectional view along the line A-A as well as a perspective depiction of each of the two axial sides. Starting at the radial inner edge of the recess 2 on the side facing away from the ring gear, there is a radially oriented cylindrical depression 10 that is flush thereto in order to hold a so-called pilot bearing 30 of a drive shaft 32 of the drive gear 34, which are shown schematically in FIGS. 5 and 6. For example, the end section of the pinion shaft on the driven side of a drive pinion that has a bearing and that engages with the recess can be inserted into said depression 10. In the installed state, the bearing axis of the pilot bearing of the pinion head is oriented at an angle of 90°, or approximately 90°, relative to the bearing axis of the bearing of the ring disk on the radial inner ring collar 4 of the support element.

On its circumference, the double outer ring collar 22 forms a fastening section that is axially longer than the ring collar 7 in the embodiment according to FIGS. 1 and 2. The collar-shaped axially protruding ring support with the ring-shaped, axial bearing surface 8 on the end face is formed radially on the inside in the area of central shaft passage. The ring support is reinforced by a ribbed structure 9 that is distributed along its circumference and that runs radially outwards from the circumference with a diminishing height.

LIST OF REFERENCE NUMERALS 1 support element
2 recess
3 teeth
4 ring collar
5 through-opening
6 bearing surface
7 ring collar
8 bearing surface
9 ribbed structure
10 depression
11 drive shaft
12 intermediate shaft
13 planet carrier
14 gear housing
15 contact surface
16 contact surface
17 internal gearwheel
18 differential ring
19 planet carrier
20 sunwheel
21 fixed bearing
22 ring collar

The invention claimed is:

1. An arrangement for supporting an input gear of a transmission in a motor vehicle, comprising:
a pot-shaped support element including a radially extending section, an outer collar at an outer circumference thereof protruding axially in a first direction from a radially outer end of the radially extending section, the support element having a recess formed therein for receiving a drive gear driving the input gear, the support element including an inner collar at an inner circumference thereof protruding axially in a second direction opposite the first direction from a radially inner end of the radially extending section, the inner collar configured for extending at least partially axially into the input gear radially inside of an inner circumference of the input gear,
wherein the radially extending section connects the outer collar and the inner collar, the recess extending radially from the outer collar partially into the radially extending section.

2. The arrangement as recited in claim 1 wherein the input gear is a ring gear.

3. The arrangement as recited in claim 2 wherein, in the area of teeth of the ring gear, on a ring section, the support element has a curved shape that matches the contour of the teeth.

4. The arrangement as recited in claim 2 wherein, in order to support the ring gear, the ring gear being used to drive a planetary gear, the support element is arranged coaxially to the ring gear, the drive gear being a drive pinion, the drive pinion configured for driving the ring gear, the drive pinion engaging radially into the recess of the support element, the inner collar being a ring on a side of the support element facing the ring gear, the inner collar configured for holding a bearing of the ring gear, the diameter of said inner collar being smaller than that of the ring gear so that the inner collar overlaps at least partially with the inner circumference of the ring gear.

5. The arrangement as recited in claim 2 wherein, in an overlapping area of the support element and the ring gear, a bearing of the ring gear is directly supported on the inner circumference of the ring gear and on an outer circumference of the inner collar of the support element.

6. The arrangement as recited in claim 2 wherein a radially outer surface of a bearing of the ring gear is arranged so as to be radially flush with a radially inner surface of teeth of the ring gear.

7. The arrangement as recited in claim 1 wherein the support element has at least one axial through-opening on a radially outer edge area, the at least one axial through-opening allowing lubricant to flow between two axial sides of the support element.

8. The arrangement as recited in claim 1 wherein the support element is made of sheet metal.

9. The arrangement as recited in claim 1 wherein the outer collar is a ring configured for joining to a stationary part.

10. The arrangement as recited in claim 9 wherein the stationary part is a gear housing.

11. The arrangement as recited in claim 1 wherein, radially on the inside, the support element has a ring support radially outside of the inner collar projecting in the form of a further collar facing away from the inner collar, the ring support forming a ring-shaped axial bearing surface on end face of the support element.

12. The arrangement as recited in claim 1 wherein, in the area of the recess, the support element has a bearing receptacle for a pilot bearing to accommodate a drive shaft of the drive gear.

13. The arrangement as recited in claim 12 wherein the drive shaft is a pinion shaft of a drive pinion.

14. An arrangement for supporting an input gear of a transmission in a motor vehicle, comprising:
a pot-shaped support element including a radially extending section, an outer collar at an outer circumference thereof protruding axially in a first direction from a radially outer end of the radially extending section, the support element having a recess formed therein for receiving a drive gear driving the input gear, the support element including an inner collar at an inner circumference thereof protruding axially in a second direction opposite the first direction from a radially inner end of the radially extending section, the inner collar configured for extending at least partially axially into the input gear radially inside of an inner circumference of the input gear,
wherein the input gear is a ring gear,
wherein, in order to support the ring gear, the ring gear being used to drive a planetary gear, the support element is arranged coaxially to the ring gear, the drive gear being a drive pinion, the drive pinion configured for driving the ring gear, the drive pinion engaging radially into the recess of the support element, the inner collar being a ring on a side of the support element facing the ring gear, the inner collar configured for holding a bearing of the ring gear, the diameter of said inner collar being smaller than that of the ring gear so that the inner collar overlaps at least partially with the inner circumference of the ring gear.

15. An arrangement for supporting an input gear of a transmission in a motor vehicle, comprising:
a pot-shaped support element including a radially extending section, an outer collar at an outer circumference thereof protruding axially in a first direction from a radially outer end of the radially extending section, the support element having a recess formed therein for receiving a drive gear driving the input gear, the support element including an inner collar at an inner circumference thereof protruding axially in a second direction opposite the first direction from a radially inner end of the radially extending section, the inner collar configured for extending at least partially axially into the input gear radially inside of an inner circumference of the input gear,
wherein, radially on the inside, the support element has a ring support radially outside of the inner collar projecting in the form of a further collar facing away from the inner collar, the ring support forming a ring-shaped axial bearing surface on end face of the support element.

* * * * *